United States Patent [19]
Colovas et al.

[11] 3,730,583
[45] May 1, 1973

[54] PASSENGER COMPARTMENT

[75] Inventors: Denny D. Colovas; John S. Logan; Richard R. Skruch, all of Dearborn, Mich.

[73] Assignee: Ford Motor Company, Dearborn, Mich.

[22] Filed: May 21, 1971

[21] Appl. No.: 145,681

[52] U.S. Cl. ................... 296/64, 296/155, 105/345
[51] Int. Cl. ............................................. B60n 1/00
[58] Field of Search ............................. 296/64, 155; 105/329, 341, 344, 345

[56] References Cited

UNITED STATES PATENTS

| | | | |
|---|---|---|---|
| 1,685,792 | 10/1928 | Warren | 105/345 |
| 3,455,597 | 7/1969 | Sherbert et al. | 296/64 |

*Primary Examiner*—Kenneth H. Betts
*Assistant Examiner*—John A. Pekar
*Attorney*—John R. Faulkner and William E. Johnson

[57] ABSTRACT

An improved passenger compartment for a transportation vehicle having floor and ceiling structures is disclosed. A first pair of side walls are provided which are spaced equally from a first axis passing along the length of the passenger compartment. Each of the first side walls has an extensive and identical opening therethrough. The center of the opening in one of the first side walls is spaced a fixed distance on one side of a second axis passing across the width of the passenger compartment in a directing perpendicular to the first axis. The center of the opening in the other of the first side walls is spaced the same fixed distance on the other side of the second axis. A second pair of walls are provided for the vehicle. The walls of the second pair are spaced equally from but on opposite sides of the second axis. The walls of the second pair join opposite ends of the first pair of side walls thereby, with the floor and the ceiling structures, to define the passenger compartment.

5 Claims, 1 Drawing Figure

PATENTED MAY 1 1973
3,730,583
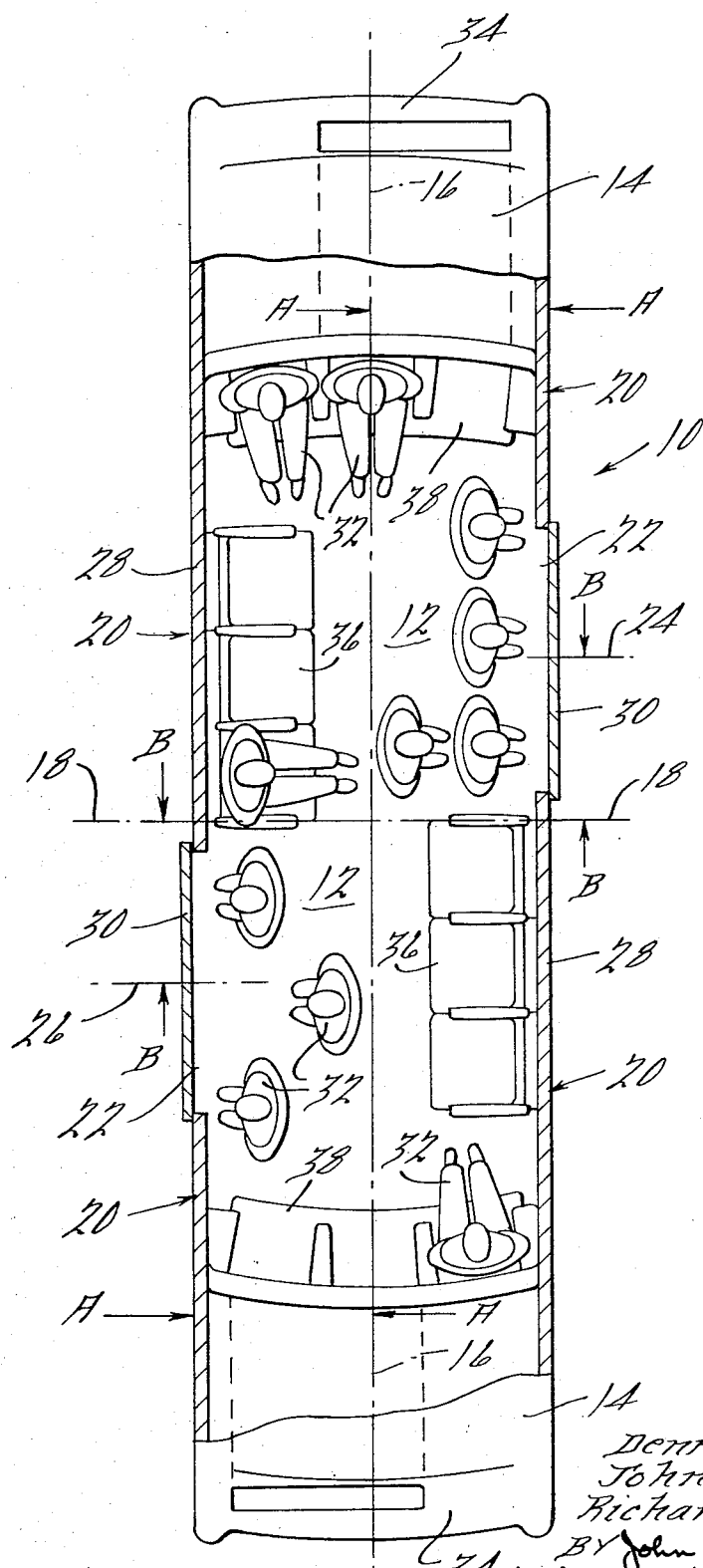
INVENTORS.
Denny D. Colovas
John S. Logan
Richard R. Skruch
BY John R. Faulkner
William E. Johnson
ATTORNEYS 3,730,583

PASSENGER COMPARTMENT

BACKGROUND OF THE INVENTION

Many shapes and configurations of passenger compartments for transportation vehicles are known. In particular, many shapes and configurations are known for transportation systems for moving large numbers of people. For example, both railway cars and subway cars have been constructed with many different passenger configurations.

It is a principal purpose of this invention to provide an improved passenger compartment for a transportation vehicle which allows the seating arrangement of the vehicle to be symmetrical about an axis of the vehicle whereby interchangeability of parts such as body panels, seats, doors and windows may be accomplished. It is also a purpose of this invention to provide a passenger compartment wherein at least some seats face towards the doors of the vehicle thereby allowing ease of entrance and exit by eliminating the need for passengers to pass between seated passengers and other vehicle seats. It is also another purpose of this invention to provide an improved passenger compartment for a vehicle in which doors on both sides of the vehicle allow rapid entrance and exit with passenger circulation between doors to allow passengers to exit from either side or find an available seat from either door of the vehicle. It is a further purpose of this invention to provide an improved passenger compartment for a vehicle in which personal eye contact between passengers is replaced by a view either to an opposite side window or for the full length of the vehicle. It is also a further purpose of this invention to provide an improved passenger compartment in which, during low passenger volume periods, a large floor area exists in front of seated passengers for placement of carry on articles such as luggage and/or shopping bags. It is a still further purpose of this invention to provide an improved passenger compartment for a vehicle which may be employed in interconnecting various facilities of a general development subdivision which includes business, shopping, office and residential locations.

SUMMARY OF THE INVENTION

This invention is directed to an improved passenger compartment for a transportation vehicle and, more particularly, to an improved passenger compartment for a transportation vehicle having floor and ceiling structures.

In general, the improved passenger compartment of this invention employs first wall structures which define a pair of first side walls for the vehicle. Each of the first side walls is spaced equally from a first axis passing along the length of the passenger compartment of the vehicle. Each of these first side walls has an extensive and identical opening therethrough through which passengers may board or depart from the vehicle. The center of the opening in a first one of the first side walls is spaced a fixed distance on one side of a second axis passing across the width of the passenger compartment of the vehicle in a direction perpendicular to the first axis. The center of the opening in the second of the first pair of side walls is spaced the same fixed distance on the other side of the second axis. Second wall structures define a second pair of side walls for the vehicle. Each of the second side walls is spaced equally from but on opposite sides of the second axis. These second side walls join opposite ends of the first side walls thereby, with the floor and the ceiling structures, to define the passenger compartment.

In further detail, doors are provided for closing the openings in the first walls. At least a pair of passenger seats are provided, one seat being located against each of the first walls in generally facing relationship with the extensive opening in an opposed one of the first walls. Further seats are also provided which are located on opposite sides of the second axis. These further seats are positioned near associated one of the second walls in facing relationship to an opposed one of the second walls.

BRIEF DESCRIPTION OF THE DRAWING

The drawing depicts a plan view, partly in cross section, of an improved passenger compartment for a transportation vehicle constructed in accordance with the teachings of this invention.

DESCRIPTION OF THE PREFERRED EMBODIMENT

In the drawing there is shown an improved passenger compartment for a transportation vehicle, the vehicle being generally designed by the numeral 10. The vehicle has a floor structure 12 and a ceiling structure 14. The length of the vehicle is divided by a first axis 16. This first axis is an imaginary, vertical plane running along the length of the vehicle to divide the same into two identical halves. A second axis 18 is perpendicular to the first axis 16. This second axis is also an imaginary, vertical plane running across the width of the vehicle to divide the same into identical halves.

A first pair of identical, wall structures, generally designated by the numeral 20, are provided. The wall structures are arranged between the ceiling structure 14 and the floor structure 12 at equally spaced distances A—A on opposite sides and in parallel relationship to the first vertical plane 16.

Each of the first wall structures 20—20, has a portion with an opening 22 therein. The opening is of sufficient size to permit at least a pair of passengers to pass therethrough in side by side relationship. The center 24 of one of the openings 22 is set a fixed distance B—B, on one side of the second vertical plane 18. The center 26 of the other opening 22 is set the same fixed distance B—B on the other side of the second vertical plane 18.

Each of the first pair of walls 20—20 also has a wall backing portion 28. This wall backing portion may have windows therein (not shown) if desired. The only real requirement of this portion of the wall is that it form a solid structure suitable for defining an interior wall of a passenger compartment.

As is apparent from the drawing, the first pair of walls 20—20 provide wall structures which present identical portion locations when viewed by a passenger facing the same. In such a manner, the walls are symmetrical about the vertical planes and are interchangeable one with the other. A pair of doors 30—30, suitably secured to the vehicle 10 by structure (not shown) are provided to cover the openings 22 in the first pair of walls 20—20. Again with reference to the drawing, it may be seen that a pair of passengers, generally identified by the numeral 32, may easily move through the doors when they are opened thereby providing easy entrance and exit from the vehicle.

A second pair of identical wall structures 34—34 are also provided. The second pair of wall structures are arranged between the ceiling 14 and the floor 12 at positions equally spaced on opposite sides and in generally parallel relationship to the second vertical plane 18. The second walls interconnect opposed ends of the first pair of wall structures 20—20 to define the passenger compartment of the vehicle 10. Again the second pair of wall structures may have windows therein or any suitable type of an arrangement desirable for enclosing a vehicle's passenger compartment.

A first pair of identically constructed passenger seat structures 36—36 are provided. Each of these seat structures will support three passengers in the preferred embodiment. Each of these first pair of seats are identically located in the vehicle's passenger compartment from the first and second vertical planes 16 and 18. Each seat structure 36 is located against a wall backing portion 28 of one of the first wall structures 20 in facing relationship to an opening 22 in an opposed one of the first wall structures. By arranging the first pair of seat structures 36 in this manner, large floor spaces are provided in front of the seats for large objects. Such space may be used during times of low passenger volume on the vehicle for transporting luggage or other large objects carried on by seated passengers. The seating arrangement also permits passengers 32 seated in the seat structures 36—36 to look out through the glass of the doors 30—30 and thereby avoid eye to eye contact from a facing passenger. Also by facing the seat structures 36—36 toward the doors, an ease of entrance and exit is provided to the passengers. This arrangement eliminates the need for an individual passenger to pass between seated passengers and other seats to enter or leave the vehicle. The doors on opposite sides of the vehicle 10 allow rapid passenger entrance and exit and provide circulation between the doors to allow the passengers to exit from either side or find an available seat from either door.

A second pair of identically constructed seat structures 38—38, is also provided. Each of the second pair of seat structures will contain three passengers in the preferred embodiment. These seat structures are identically located from the first and the second vertical planes 16 and 18 near an associated one of the second wall structures 34. As may best be seen in the drawing, each of the second pair of seat structures 38 face one another from opposite ends of the passenger compartment of the vehicle 10. Because of the long distance between these seat structures, the personal eye contact between opposed, seated passengers is avoided. Also the seat structures 38—38 are positioned a greater distance from the second vertical plane 18 than the two centers 24 and 26 of the openings 22—22 in the first pair of side walls 20—20.

There has been disclosed herein an improved passenger compartment for a transportation vehicle. Many modifications of this passenger compartment will be apparent to those skilled in the art in view of the teachings of this specification. It is intended that all such modifications which fall within the true spirit and scope of this invention be included within the scope of the appended claims.

We claim:

1. An improved passenger compartment for a transportation vehicle having a floor and ceiling structures with a first, imaginary, vertical plane running along the length of the compartment to divide the same into identical halves and a second, imaginary, vertical plane perpendicular to said first vertical plane running across the width of the compartment to divide the same into identical halves, which passenger compartment comprises:

a first pair of identical wall structures, each of said first wall structures being arranged between the ceiling and the floor structures at equally spaced distances on opposite sides and in parallel relationship to said first vertical plane, each of said wall structures further having both a portion thereof with an opening therein of sufficient size to permit a passenger to pass therethrough and another, wall backing portion, said two portions of said first wall structure being identically constructed so that said first wall structures present identical locations of their said portions when viewed by a passenger in facing relationship thereto;

a second pair of identical wall structures arranged between the ceiling and the floor structures at equally spaced distances on opposite sides and in parallel relationship to said second vertical plane, said second pair of wall structures interconnecting the ends of said first pair of wall structures to define said passenger compartment side walls;

a pair of door structures, one such structure covering each of said openings in each of said first wall structures;

a first pair of identically constructed, passenger seat structures, each of said seat structures being identically located from said first and said second vertical planes against said wall backing portions of an associated one of said wall structures and in facing relationship to said opening in the other of said first wall structures; and a second pair of identically constructed passenger seat structures, each of said second seat structures being identically located from said first and said second vertical planes near an associated one of said second wall structures.

2. The improved passenger compartment as defined in claim 1 wherein: each of said first seat structures will seat three passengers.

3. The improved passenger compartment as defined in claim 2 wherein: each of said second seat structures will seat three passengers.

4. The improved passenger compartment as defined in claim 2 wherein: each of said openings in said first side wall structures is sufficiently large to permit two passengers to pass therethrough at the same time.

5. The improved passenger compartment as defined in claim 4 wherein: said second seat structures are positioned at a greater distance from said second plane than said openings in said first side wall structures.

* * * * *